W. C. PIERCE.
Seed-Planters

No. 146,613.

Patented Jan. 20, 1874.

WITNESSES.
E. Wolff
C. Sedgwick

INVENTOR.
W. C. Pierce
BY
[signature]
ATTORNEYS.

UNITED STATES PATENT OFFICE.

WILLIAM C. PIERCE, OF PUSHMATAHA, ALABAMA, ASSIGNOR TO KNIGHTON & WILLIS, OF SAME PLACE.

IMPROVEMENT IN SEED-PLANTERS.

Specification forming part of Letters Patent No. 146,613, dated January 20, 1874; application filed October 25, 1873.

*To all whom it may concern:*

Figure 1:
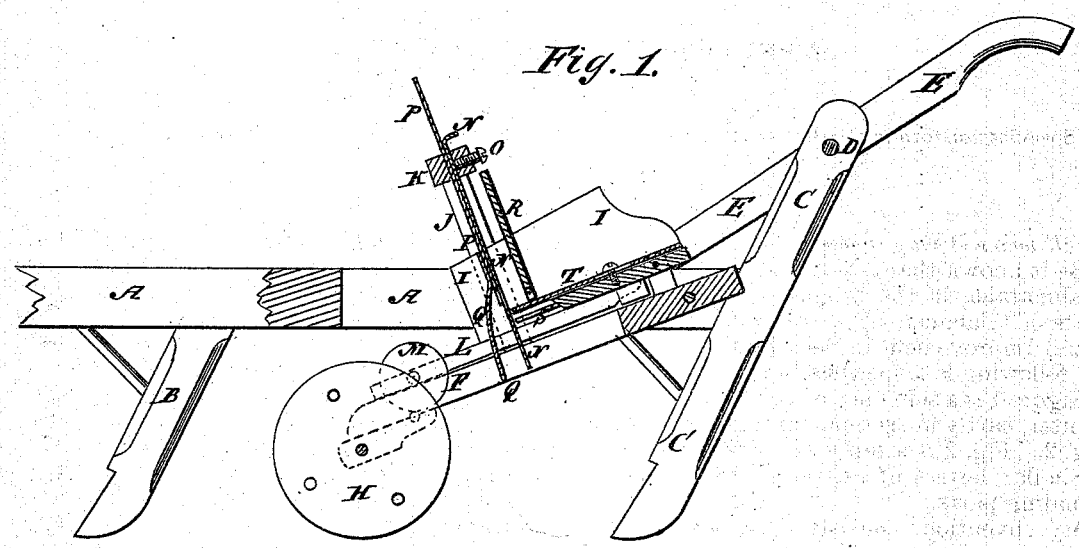
Figure 2:
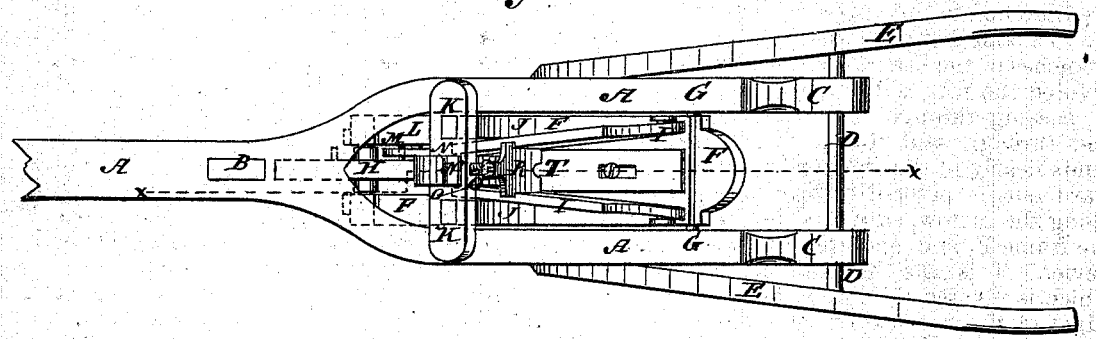

Be it known that I, WILLIAM C. PIERCE, of Pushmataha, in the county of Choctaw and State of Alabama, have invented a new and useful Improvement in Seed-Planter, of which the following is a specification:

Figure 1 is a side view of my improved seed-planter, partly in section, through the line *x x*, Fig. 2. Fig. 2 is a top view of the same.

Similar letters of reference indicate corresponding parts.

My invention consists, principally, in a frame hinged to the beam of the planter, supported by a wheel at its lower or free end, and having the hopper and seed-dropping apparatus attached, all as hereinafter described.

A is the beam, the rear end of which is forked or branched, as shown in Fig. 2. To the forward part of the beam A is attached the standard B of the plow, for opening a furrow to receive the seed. To the rear ends of the branches of the beam A are attached the standards C, for the covering plows or boards. The standards C project upward, and through their upper end passes the round D, which passes through and supports the handles E. The forward ends of the handles E are attached to the opposite sides of the beam A. To and between the rear ends of the branches of the beam A, or the standards C, is pivoted the rear end of the frame F by a pin, G, passing through said beam or standards, and through said frame. The frame F extends nearly to the standard B, and to its forward end is pivoted a wheel, H, which rolls along the furrow, supports the forward end of the frame F, and operates the seed-dropping device. I is the hopper, the rear end of which is pivoted to lugs attached to the side edges of the rear end of the frame F, so that the forward end of the hopper may move up and down. To the frame F, at the opposite sides of the forward end of the hopper I, are attached the lower ends of two uprights, J, the upper ends of which are connected and held in their proper relative position by a cross-bar, K, attached to them. The ends of the cross-bar K project so as to strike against the top of the beam A, and prevent the frame F and its attachments from dropping down too far. To the bottom of the hopper I is attached a bar, L, which projects forward along one side of the top of the frame F, so as to pass at the side of the wheel H. To the forward end of the bar L is pivoted a small wheel, M, in such a position as to be struck by the pin or pins attached to the wheel M, to give an up-and-down movement to the hopper. N is a slide or plate, which forms the forward end of the hopper, and upon which said hopper moves up and down. The upper end of the slide or plate N passes up through a slit in the cross-bar K, where it is adjustably secured in place by a set-screw, O. The slide N has a hole formed through it, through which, when the hopper I rises, the seed escapes and drops to the ground. The side of the hole through the slide N is regulated by a slide, P, placed upon its rear side, and which, also, passes up through the slit in the cross-bar K. To the rear side of the slide P, a little above the discharge-hole in the slides N P, is attached a bar, Q, which projects forward and downward, to prevent the seeds from scattering, and to guide them downward into the furrow. R is a gate, which slides up and down in grooves in the sides of the hopper I, and in its lower edge is formed a notch, so that, by raising or lowering the gate R, more or less seed may pass back and escape through the slides N P. The forward end of the bottom of the hopper I is cut away, and in the opening thus formed are placed two or more rods or fingers, S. Upon the bottom of the hopper I is placed a false bottom, T, which is secured in place by a screw, which passes through a slot in the false bottom T, and screws into the hopper-bottom.

With this construction for planting corn and other seeds in hills, the gate R and plate N are adjusted so that, by each revolution of the large wheel H, the desired number of kernels may be dropped to the ground.

For planting small seeds in drills, the space through which the seeds pass is partially closed by adjusting the plate N, and a sufficient number of pins are placed in the larger wheel H to keep the hopper I in constant motion.

For planting cotton-seed, the gate R is removed, and the false bottom T is drawn back to uncover the opening in the forward end of the hopper-bottom.

Having thus described my invention, I claim as new and desire to secure by Letters Patent—

The combination, with the pivoted frame F, wheel H, standards and cross-bar J K, and pivoted hopper I, of the arm and wheel L M, adjustable plates N P Q, detachable gate R, adjustable false bottom T, and forked beam A, substantially as herein shown and described.

WILLIAM C. PIERCE.

Witnesses:
J. B. MORTIMORE,
W. H. HALL.